United States Patent
Seebacher et al.

(10) Patent No.: US 7,350,972 B2
(45) Date of Patent: Apr. 1, 2008

(54) DISTRIBUTED TEMPERATURE SENSOR USING OPTICAL REFLECTOMETRY

(75) Inventors: Peter John Seebacher, Pennant Hills (AU); Ian Keith Hook, North Mead (AU); Paul Randall Stoddart, Hawthorn (AU)

(73) Assignee: Peter Seebacher, Pennant Hills NSW ( * ) Notice: Subject to any disclaimer, the term of this patent is extended or adjusted under 35 U.S.C. 154(b) by 42 days.

(21) Appl. No.: 10/529,808

(22) PCT Filed: Sep. 29, 2003

(86) PCT No.: PCT/AU03/01280
§ 371 (c)(1),
(2), (4) Date: Dec. 15, 2005

(87) PCT Pub. No.: WO2004/029568
PCT Pub. Date: Apr. 8, 2004

(65) Prior Publication Data
US 2006/0153274 A1    Jul. 13, 2006

(30) Foreign Application Priority Data
Sep. 27, 2002  (AU) ................. 2002951705

(51) Int. Cl.
*G01K 11/00* (2006.01)
*G01N 21/00* (2006.01)
(52) U.S. Cl. ............... 374/161; 374/130; 356/73.1; 356/337; 356/342
(58) Field of Classification Search ........... 374/161, 374/130–131; 356/73.1, 337, 342
See application file for complete search history.

(56) References Cited

U.S. PATENT DOCUMENTS

| | | | | |
|---|---|---|---|---|
| 4,823,166 A * | 4/1989 | Hartog et al. | ............... | 356/44 |
| 5,113,277 A * | 5/1992 | Ozawa et al. | ............... | 398/79 |
| 5,217,306 A * | 6/1993 | Wada | ............... | 374/161 |
| 5,592,282 A * | 1/1997 | Hartog | ............... | 356/44 |
| 5,638,172 A * | 6/1997 | Alsmeyer et al. | ............... | 356/301 |
| 5,765,948 A * | 6/1998 | Sai | ............... | 374/161 |
| 5,820,265 A * | 10/1998 | Kleinerman | ............... | 374/137 |
| 2003/0021528 A1 * | 1/2003 | Fredin et al. | ............... | 385/31 |

\* cited by examiner

*Primary Examiner*—Gail Verbitsky
*Assistant Examiner*—Megann E Vaughn
(74) *Attorney, Agent, or Firm*—Martin E. Hsia

(57) ABSTRACT

A temperature sensing method in which pulses of optical radiation are launched by a laser diode (11) into an optical fibre (14) and optical radiation backscattered from the fibre is detected, the method comprising passing the backscattered radiation through a single optical filter (15) whereby a first signal is recorded at the anti-Stokes Raman wavelength from a signal launched by the laser diode in a laser mode and a second signal is recorded at the Rayleigh wavelength from a signal launched by the laser diode in a light emitting diode mode, and a comparison is made of the two signals to provide an indication of temperature.

17 Claims, 8 Drawing Sheets

DISTRIBUTED TEMPERATURE SENSOR USING OPTICAL REFLECTOMETRY

INTRODUCTION

This invention relates to improvements in optical time domain reflectometry and more particularly relates to a distributed temperature sensor and its method of operation.

BACKGROUND OF THE INVENTION

A distributed temperature sensor (DTS) measures temperatures along an optical fibre that is located in thermal contact with an object to be measured. The principle of operation of a DTS is analogous to that of RADAR and SONAR. In RADAR, the total time that an electromagnetic probing pulse takes to travel from the source to a distant object and that its reflection takes to return to the origin, together with the known speed of the electromagnetic wave, allows the location of a distant object to be deduced. In SONAR an acoustic probing signal is employed. In DTS systems a very short pulse of laser light (less than 100 ns) is used as the probe. After leaving the laser the light pulse travels through an optical fibre to an optical coupler and into the sensing fibre. As the light pulse travels along the sensing fibre, the pulse intensity is attenuated by scattering and absorption in the fibre material.

Modern high-purity optical fibres have a window of low absorption for wavelengths from approximately 0.8 to 1.7 μm. Within this window, the optical losses are dominated by Rayleigh scattering, which contributes the following term to the total attenuation:

$$\alpha_R = \frac{8\pi^3}{3\lambda^4}(n^2-1)^2 \beta_T k T_f,$$

where $\lambda$ is wavelength, n is the refractive index, $\beta_T$ is the isothermal compressibility at $T_f$, k is Boltzmann's constant and $T_f$ is a constant related to the glass anneal temperature. The attenuation coefficient is usually expressed in units of dB/km. The probe pulse is also attenuated by interactions with the optical medium that change the wavelength of the light. Brillouin and Raman scattering are the most important of these relatively weak scattering mechanisms. These interactions cause light to be scattered back towards the proximal end of the fibre as light of different wavelengths. The backscattered power received for Raman scattering at a particular wavelength $\lambda_s > \lambda$ (known as the Stokes component) is given by $$P_s \propto \frac{1}{\lambda_s^4[1-\exp(-h\nu/kT)]},$$

while for $\lambda_{as} < \lambda$ (the anti-Stokes component) the backscattered power is given by $$P_{as} \propto \frac{1}{\lambda_{as}^4[\exp(h\nu/kT)-1]},$$

where h is Planck's constant, ν is the frequency shift of the scattered light and T is the temperature. Thus, while most light energy is transmitted in the forward direction along the fibre, a small fraction of it is scattered backwards, where it may be detected and analysed. Of the backscattered light, the Rayleigh scattering occurs at the probe wavelength and is relatively insensitive to temperature changes in the fibre, while the Raman scattering is shifted in wavelength from the probe light and has an explicit temperature dependence.

In general, the accurate derivation of quantities based on the measurement of light intensity is most conveniently made through the measurement of light intensity ratios, because the absolute intensity (or power) is difficult to measure accurately. The intensity of an optical signal can be influenced by a large number of variables in addition to the quantity of interest. For example, the power output of the source, the efficiency of the detector and the efficiency of the optical elements could all be affected by changes in ambient temperature or humidity. Some components may be subject to ageing effects. These effects can be difficult to predict or identify and are therefore difficult to model reliably. Alternatively, the effects can be reduced through the provision of a stable thermal environment and suitable calibration means. In the art, it has been argued that various combinations of these approaches (ratiometric and calibration) can provide practical and efficient solutions to obtaining accurate measurements of temperature distribution, given all of the various sources of uncertainty that apply.

The method of detection and analysis varies between different DTS embodiments based on glass optical fibres. In the earliest embodiments, a diffraction grating was used to filter out a band of backscattered wavelengths close to the laser wavelength (mainly the Rayleigh scattering). The Stokes and anti-Stokes Raman wavelengths were allowed to pass to separate detectors and the intensity ratio of these components was used to derive the temperature as a function of range in the fibre (see GB 2,140,554A).

An improved method was subsequently devised, whereby the Rayleigh scattering and anti-Stokes Raman scattering are selected for measurement by separate detectors (see GB 2,183,821A). These intensities are compared in a ratio device to give an indication of the temperatures in the fibre. It is claimed that this arrangement permits a much faster response than the prior art method, as the Rayleigh scattered light is much more intense than the Stokes Raman and can be sensed using relatively simple and inexpensive equipment.

In a further development, a method was devised whereby a single spectral band of the backscattered radiation (usually a region of the broad anti-Stokes spectrum) is selected for analysis (see U.S. Pat. No. 4,823,166). The method uses a calibration function to deduce the temperature distribution from the measured backscatter power. The data conversion may be carried out either using a tabulated variation of the backscatter factor with temperature, or via a theoretical model that relates absolute temperature to intensity as a function of $\lambda_{as}$.

It is claimed that the embodiments described in U.S. Pat. No. 4,823,166 remove the need for corrections to be made for the difference in fibre attenuation between the Stokes and anti-Stokes wavelengths. It is also claimed that the system offers enhanced sensitivity to temperature changes, reduced sensitivity to drifts in the source wavelength and a simplified optical arrangement. Short-term changes in the energy and wavelength of the source can be detected and corrected by monitoring a short reference section of the fibre that is held at a constant temperature in a temperature-controlled chamber. However, since this approach relies on the accurate measurement of intensity in a single spectral band, its effectiveness is critically dependent on the elimination of variations in backscatter factor that arise from non-temperature (NT) factors. In particular, axial variations in the fibre loss are of particular concern in the current context. These are typically associated with built-in or acquired defects in the fibre that cause temperature-independent variations in the scattering coefficient.

Specification U.S. Pat. No. 4,823,166 suggests three ways in which the effects of variations in the fibre loss may be eliminated from the measured temperature distribution. The first method involves performing the measurement from each end of the optical fibre. The effects of any propagation losses are eliminated by calculating the geometric mean of the backscatter signals measured from both ends of the fibre and returning from a particular location. Unfortunately this approach adds to the instrumental complexity and is less convenient to deploy than a single-ended measurement arrangement.

A second approach involves calibrating the entire fibre before installation with a known temperature distribution. The sensor then measures departures of the backscatter intensity from those determined at the time of calibration and interprets them in terms of a temperature variation. However, this approach restricts the system to use with fibres for which a calibration has been performed and requires recalibration if the fibre properties change. The third approach makes provision for the removal of the filter to facilitate measurement of the total backscatter signal in the reference section, or over the entire fibre length, so that a normalisation can be performed. The total backscatter signal is dominated by the Rayleigh scattering, which is relatively temperature insensitive, but sensitively reflects the fibre loss characteristics. However, the need to remove the filter to perform the normalisation procedure adds to the complexity of the optical system and remains a drawback for practical operation.

It is these issues that have brought about the present invention.

SUMMARY OF THE INVENTION

In accordance with one aspect of the present invention there is provided a temperature sensing method in which pulses of optical radiation are launched by a laser diode into an optical fibre and optical radiation backscattered from the fibre is detected, the method comprising passing the backscattered radiation through a single optical filter whereby a first signal is recorded at the anti-Stokes Raman wavelength from a signal launched by the laser diode in a laser mode and a second signal is recorded at the Rayleigh wavelength from a signal launched by the laser diode in a light emitting diode mode, and a comparison is made of the two signals to provide an indication of temperature.

Preferably, the comparison produces the quotient of the anti-Stokes Raman wavelength divided by the Rayleigh wavelength.

Preferably, a photomultiplier tube is used to count photons through the single optical filter, the photon count providing an indication of temperature and the arrival time of the signals allowing identification of the position of that temperature along the length of the optical fibre cable.

In a preferred embodiment the laser diode, the single optical filter and the photomultiplier tube are coupled to the optical fibre via connectors and at least one temperature sensor is positioned downstream of the connectors to correct error signals emanating from the connectors.

The method further comprises stabilising and controlling the temperature of the laser diode and photomultiplier tube.

Preferably, a short reference section of the optical fibre is held at constant temperature in a temperature-controlled chamber.

In a preferred embodiment, two distinct controlled temperature regions are provided and the temperatures are monitored through the use of sensors in each region, and the method monitors the effect of the temperature-controlled region on the accumulated photon count.

Preferably, the pulses of optical radiation are transmitted at a wavelength between the ultra-violet and infrared spectrum and particularly at a wavelength in the range 775-800 nm.

In a preferred embodiment, the laser diode operates at a transmission power of less than 1 W.

In accordance with a further aspect of the present invention there is provided a distributed temperature sensor comprising a laser diode adapted to launch pulses of optical radiation into an optical fibre arranged to be located in thermal contact with an object, and a single optical filter to detect optical radiation backscattered from the fibre, the distributed temperature sensor being adapted to operate in accordance with the method described above.

Preferably, the single optical filter is coupled to a photomultiplier tube.

BRIEF DESCRIPTION OF THE DRAWINGS

An embodiment of the present invention will now be described by way of example only with reference to the accompanying drawings in which.

Figure 1:
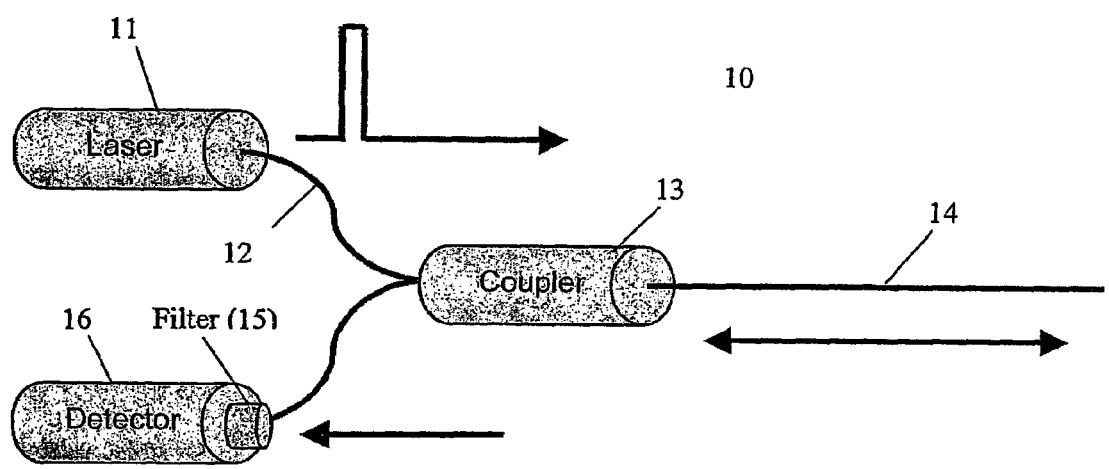
FIG. 1 is a schematic illustration of the basic components of a distributed temperature sensor.
Figure 2:
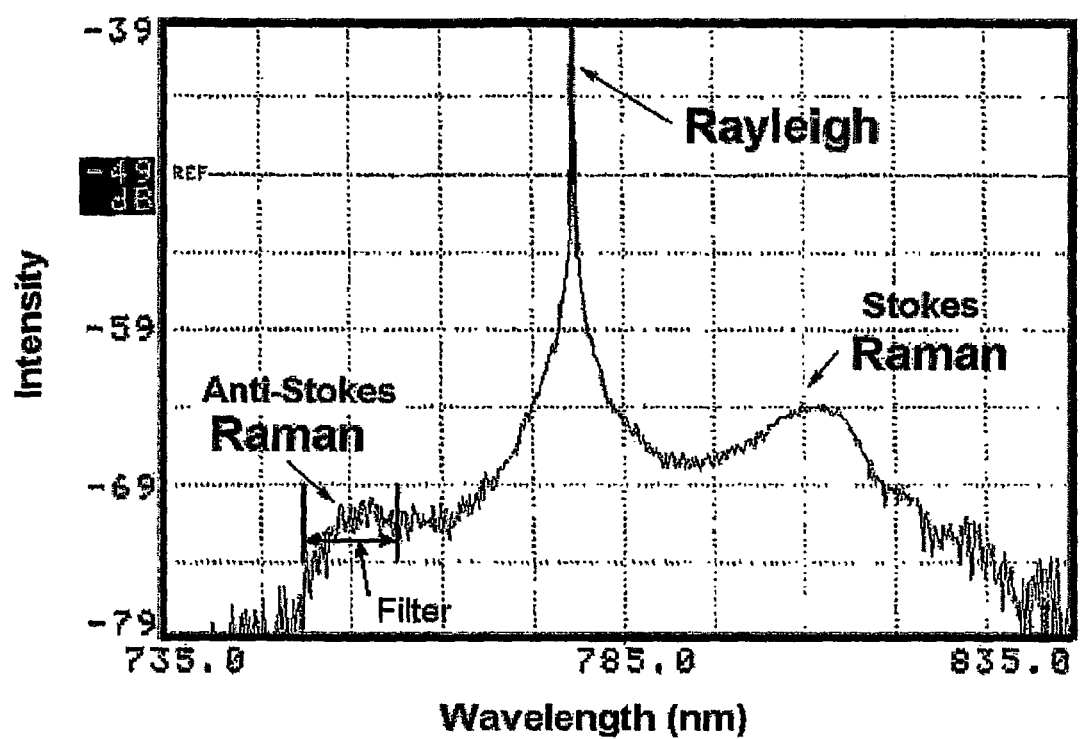
FIG. 2 is a graph of light spectrum against wavelength illustrating the major spectral features and location of an optical filter.

In the distributed temperature sensor (DTS) 10 shown in FIG. 1 a very short pulse of laser light (less than 100 ns) constitutes a probe. After leaving the laser 11 the probe light pulse travels through an optical fibre 12 to an optical coupler 13 and into the sensing fibre 14. As the probe pulse travels along the sensing fibre, the glass atoms absorb or scatter a small fraction of the incident light and the pulse intensity is attenuated. The fraction of the incident light that is scattered back along the fibre will exhibit a spectrum such as that shown in FIG. 2. In the DTS's normal operating mode the bandpass filter 15 allows only the shorter wavelength anti-Stokes light to be detected. The bandpass filter transmits a selected wavelength range, as shown in FIG. 2, to the photomultiplier light detector 16.

The DTS operates in a photon counting mode. The intensity of the light returning to the detector is sufficiently low as to comprise mostly of separate photons arriving at distinguishable times. The detection system represents each photon as an electrical signal that is digitally recorded as an event labelled with the time of arrival of the photon, measured from when the laser pulse was fired. Light to be recorded is selected with a single filter set at a central wavelength of 750-755 nm (for a probe wavelength of 780-785 nm) and a full width half maximum pass band of 10-20 nm, a transmission of greater than 75% in the passband and a rejection of better than $10^4$. The digital nature of photon counting has the advantage of reducing the sensitivity of the detection system to environmental variations. On the other hand, photon counting allows sensitive detection of extremely low light levels, which allows the use of a relatively low power laser source.

Figure 3:
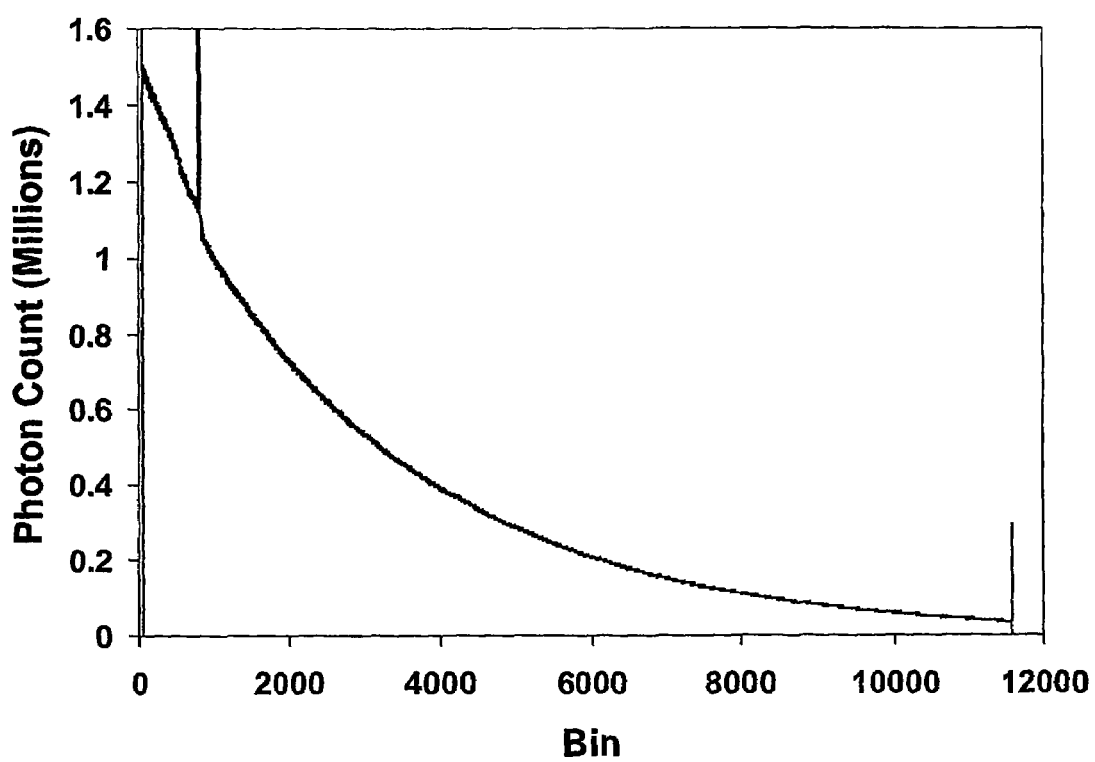
FIG. 3 is a graph illustrating an accumulated photon count.

The total time taken for light to travel from the source to the point of scatter and for the scattered light to travel back to the detector are recorded at discrete intervals of 2 ns (bins). It is the intensity of the returned light together with its time of arrival that allows the system to deduce the temperature profile along the sensing fibre. The process is repeated many thousands of times per second and the results are accumulated over a predefined period (typically minutes). FIG. 3 shows a typical accumulated photon count result. The accumulated photon count as a function of position along the fibre is then downloaded to a central processing unit where the temperature distribution is calculated. The DTS requires high-speed electronics for the LD driver and photon detection circuits but uses the essential advantages of the photon counting method to simplify all other aspects of DTS operation.

Figure 4:
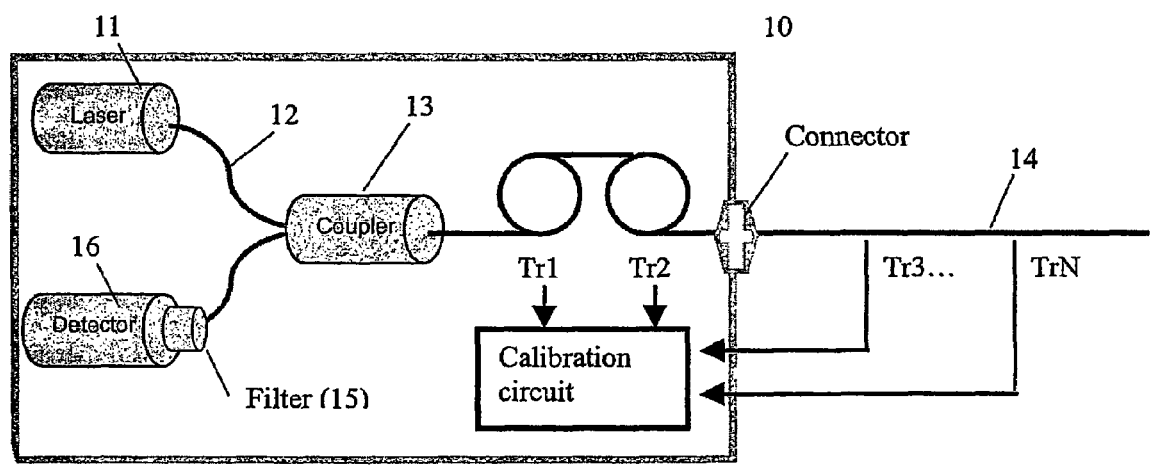
FIG. 4 is a schematic illustration of a distributed temperature sensor and temperature calibration means.
Figure 5:
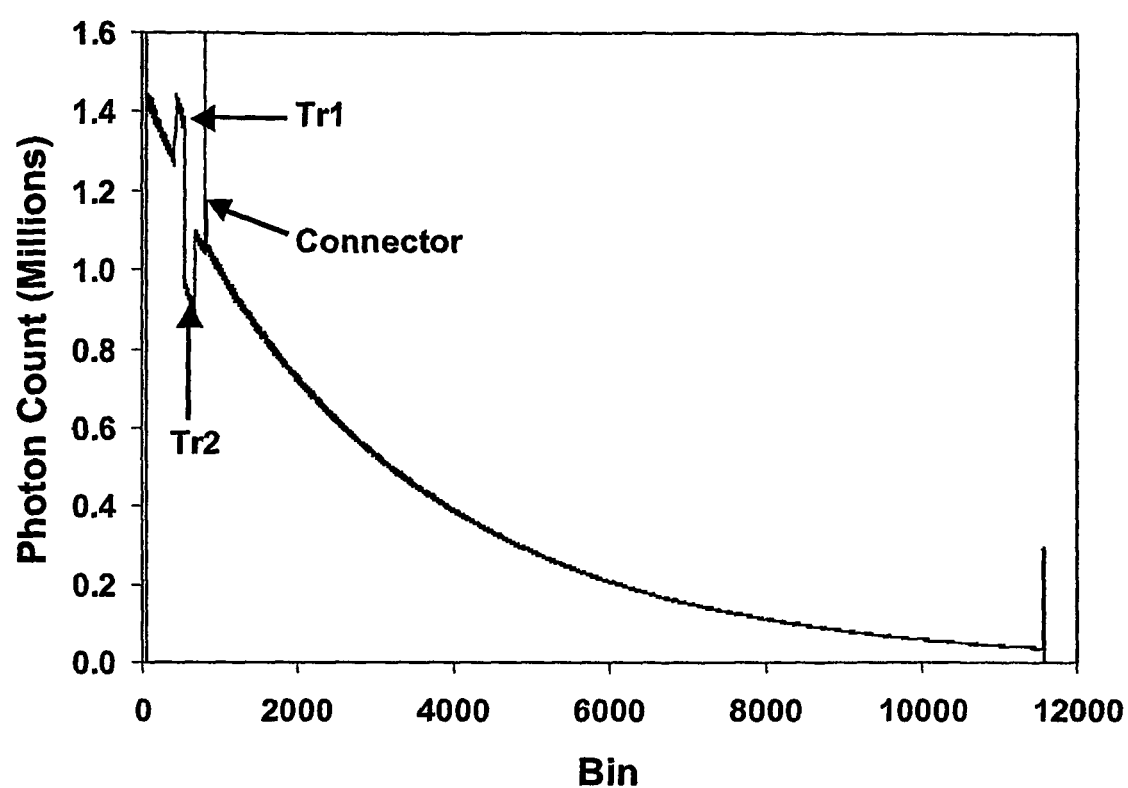
FIG. 5 is an illustration of an accumulated photon count using the calibration means of FIG. 4.

Although the use of photon counting and a relatively low power laser are inherently favourable for reducing the sensitivity of the system to environmental and other variables, it remains necessary to stabilise and control the temperature of the laser diode and photomultiplier tube. This serves to reduce the sensitivity of the system to drifts in the source wavelength with temperature and reduces the background noise level, respectively. Further allowance for short-term changes in the energy and wavelength of the source can be made by monitoring a short reference section of the fibre that is held at a constant temperature in a temperature-controlled chamber. One means of arranging such a reference section is illustrated in FIG. 4, where temperature sensors Tr1 and Tr2 monitor two distinct temperature regions. The effect of this temperature calibration region on the accumulated photon count is shown in FIG. 5.

In summary the DTS monitors the backscattered signal using:
the photon counting method to record light intensity, and
the arrival time to identify position.

The DTS distributed Sensor 10 is Characterized by:
1) A laser diode light source 11.
2) A photomultiplier light detector 16.
3) A 50/50 optical coupler 13.
4) An optical filter 15.
5) An optical fibre 14 in which temperature is measured.
6) Temperature calibration system.
7) Analogue control circuitry.
8) High-speed laser driving circuitry.
9) High-speed photon detection circuitry.
10) High-speed photon counting and accumulation circuitry.
11) A CPU for control, data collection and processing.

Figure 6:
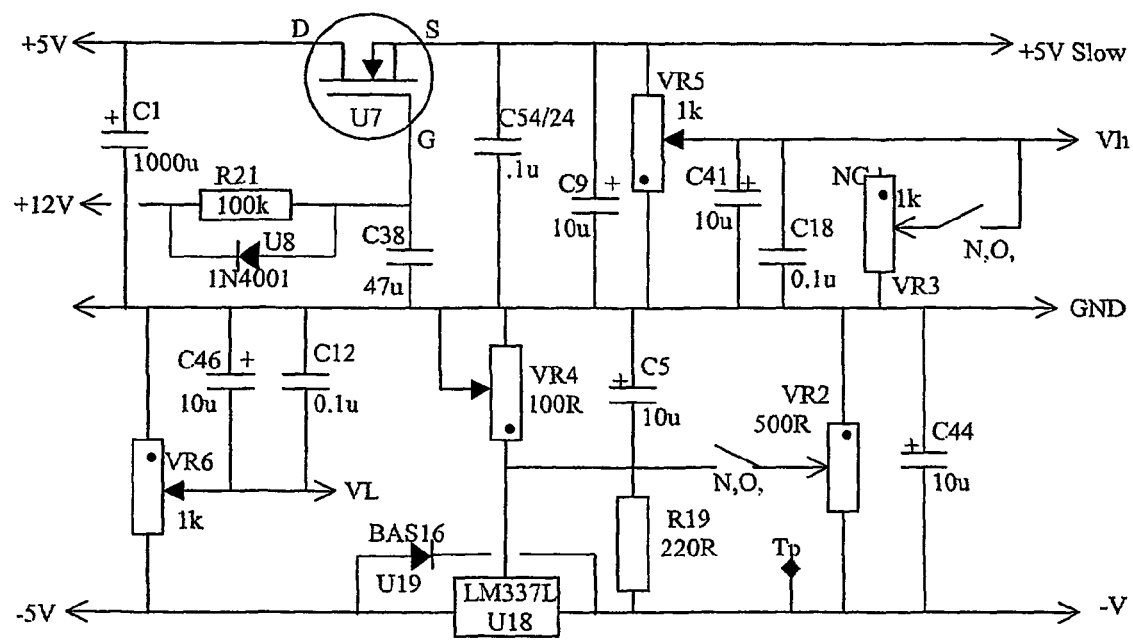
FIG. 6 is a circuit diagram relating to the LD power supply.

The light probe 11 is generated by a Sanyo DL7140 785 nm, 80 mW continuous wave output, single-mode, AlGaInP, index guided structure, solid-state laser diode. The electronic drive circuitry is shown in FIG. 6. The drive circuitry allows for two LD operating modes: LASER and LEDing mode. A complete description of these modes is given below.

FIG. 2 identifies three spectral components: the shorter wavelength anti-Stokes Raman (AS), Rayleigh (R) and the longer wavelength Stokes Raman (S). All these spectral components contain to varying degrees both temperature (T) and non-temperature (NT) information. The DTS challenge is to recover only the temperature information. Conventional distributed temperature theory provides that a temperature determination that is essentially independent of the NT effects can be made by taking the ratio AS/S or alternatively the ratio AS/R. The ratio of the amounts of light backscattered into the two Raman bands is given by:

$$R_r = \frac{\text{Anti-Stokes Intensity}}{\text{Stokes Intensity}} = \frac{\lambda_s^4}{\lambda_{as}^4}\exp\left(-\frac{hv}{kT}\right)$$

and is thus a function of the temperature of the fibre at the scattering site.

In such cases measurements of light at two separate wavelengths are required. In some embodiments of this kind of technology all three spectral components are detected and recorded. In these cases there is an increase in system complexity and more components are required, leading to increased cost. In addition, complicated corrections have to be made for the fact that the absorption loss in the fibre differs slightly at the two wavelengths and is also temperature dependent.

The DTS system described hereunder allows certain non-temperature dependent effects on the optical fibre to be measured in order to remove these effects from the final result. The NT effects are measured by means of the Rayleigh signal, which is relatively temperature insensitive. This procedure exploits the characteristics of a laser diode whereby at low current the device behaves as a light emitting diode whilst at higher currents it has the properties of a laser.

The electroluminescence of the semiconductor laser and the light-emitting diode LED result from a current flow through a p-n junction to which a voltage has been applied. Recombination of the carriers injected across the junction results in the emission of light. A measure of the quality of this process is the quantum efficiency, defined as the ratio of the number of emitted photons to the number of electrons crossing the p-n junction. The spontaneous emission of LEDs is characterised by low quantum efficiency and a relatively broad spectrum.

In the semiconductor laser both the electrons and the radiative emissions are confined by a cavity with partially reflective surfaces to produce stimulated emission. Stimulated emission in such an arrangement results when a photon with an energy slightly greater than the energy gap can interact with an electron in the conduction band and cause the electron to recombine with a hole in the valence band. This recombination process results in the emission of a photon identical to the photon that caused the recombination process, and the number of photons is increased. At low current, the laser light intensity is small and results from spontaneous emission, as in a LED. However, when the stimulated emission exceeds the internal losses, the laser threshold is reached and the light output rises rapidly with the current. Above the threshold current, most of the current flowing into the p-n junction results in laser emission, the quantum efficiency is much higher than for an LED and the emitted light is almost, but not quite monochromatic. This dual nature of semiconductor lasers is utilised in the present embodiment.

The Principle of Operation is:
a) Make a measurement with LD in LASER mode yielding a record of temperature and non-temperature data.
b) Make a measurement with LD in LED mode. In this case light passing through the filter is predominantly due to the Rayleigh effect and is not temperature sensitive.
c) Mathematically deduce a record from both signals that only reflects the temperature dependence.

Figure 7:
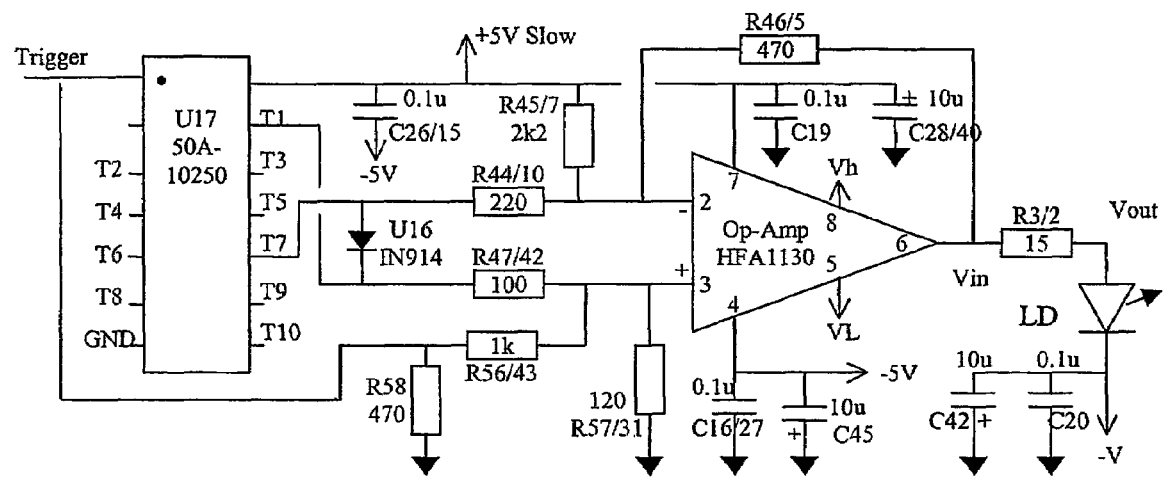
FIG. 7 is a circuit diagram relating to the LD driver electronics.

This functionality is achieved through a novel circuit, consisting of regulated power supply and laser driver elements, shown in FIGS. 6 and 7 respectively.

The Features of the Circuit are:
1. Operation in LASER mode.
2. Operation in LED mode.
3. The probe pulse can be widened to increase the power so that better temperature resolution can be obtained.
4. An ability to control the current so as to produce a high-speed probing pulse for better range resolution.

Power Supply:

When the equipment is first turned on there is no power to the LD drive circuit. A 5V supply (labelled "+5V slow" in FIG. 6) is applied to the LD drive circuit a few seconds after other system circuitry is stable. The voltages Vh and −V are variable and are used to control aspects of the laser operation as described below.

Quiescent Circuit Condition:

In the quiescent state, a negative bias voltage (−V) is applied to the LD to provide a level of current just below the value required for light emission. Its function is to reduce the amount of current required to create light emissions and thereby reduce the magnitude of the voltage swing and slew rate required of the operational amplifier (Op-Amp).

The LD is biased, in its normally-off state, by being connected between the Op-Amp output (normally 0V) and −V. The bias voltage −V is chosen to be about −1.6 V to maintain the LD just below its turn-on point. It is critical to keep the current very low in this state as modern heterostructure type LDs may act as reasonably efficient LEDs even at sub-milliamp levels. Further bias adjustment is provided by a resistor from +5V to the inverting input, particularly relevant for the period between steps 3 and 4 below.

Dynamic Behaviour:
1 Dynamic events commence when a nominally 50 ns wide TTL positive-going trigger pulse is applied to the circuit. The shape of this pulse is not particularly critical and it does not define the circuit's output pulse width. This trigger takes two paths.
   a. The trigger signal is reshaped and delayed. The input trigger pulse is reshaped into pulses with faster rise times by the 10 Schmitt triggers connected in series and internal to the 50A-10250 TTL digital delay line integrated circuit package. Reshaped versions of the input trigger signal appear at successive outputs of this package, each of which is delayed by 2.5 ns from the previous one.
   b. To improve the LD's turn-on-time a small bias current is applied to the diode prior to the application of the trigger signal from the delay line. This bias current is due to a small fraction of the input trigger pulse that is applied to the non-inverting input of the operational amplifier (HFA1130).
2. In the circuit shown in FIG. 7, one of the reshaped signals delayed by 2.5 ns (T1) is connected to the non-inverting input of an HFA1130 Op-Amp. At this point the inverting input source is still zero, and the amplifier output is large and positive. Current limit into the LD is provided by a combination of the Op-Amp Vh output limit and a 15 Ω series resistor.

It should be noted that the HF1130 Op-Amp has two critical differences from other so-called "fast" Op-Amps. Firstly the HF1130 contains high and low output voltage limit circuitry (Vh and VL inputs), which prevent the internal circuitry from saturating. This allows very large gains to be used, which effectively improve the rise time of the output without the normally associated dampened response caused by saturation in other Op-Amps. Secondly, the HFA1130 output drive contains special high speed/current components with more in common to a Norton Amplifier than an Op-Amp. The output rise time is 6000 V/µs which is much faster than typical driver circuits with speeds of only 100-500 V/µs for low loads and small signals. All Op-Amp inputs comply with manufacturers recommendations for input impedance and circuit layout as far as practicable.
3. The second delayed trigger pulse from the delay line is connected to the inverting input of the Op-Amp. Any one of the delayed outputs (for example T7) can be used. The final output pulse width is determined by the time difference (for example T1-T7). This signal causes an inverted and greatly amplified output which reverse biases the LD and completely switches it off much faster then zero biasing would. The Op-Amp inputs have a common mode voltage of approx 2.5 V at this stage.
4. When the first delay line output returns to zero volts, but before the second output does, the diode (U16) between the delay line outputs conducts and briefly shorts them. This begins to switch off the LD reverse bias and removes an output spike that would otherwise be present. A small signal silicon diode, such as the common IN914B, with high speed under these conditions is most appropriate.
5. Both delay line outputs have returned to zero volts and LD is returned to non-conducting state.

Figure 8:
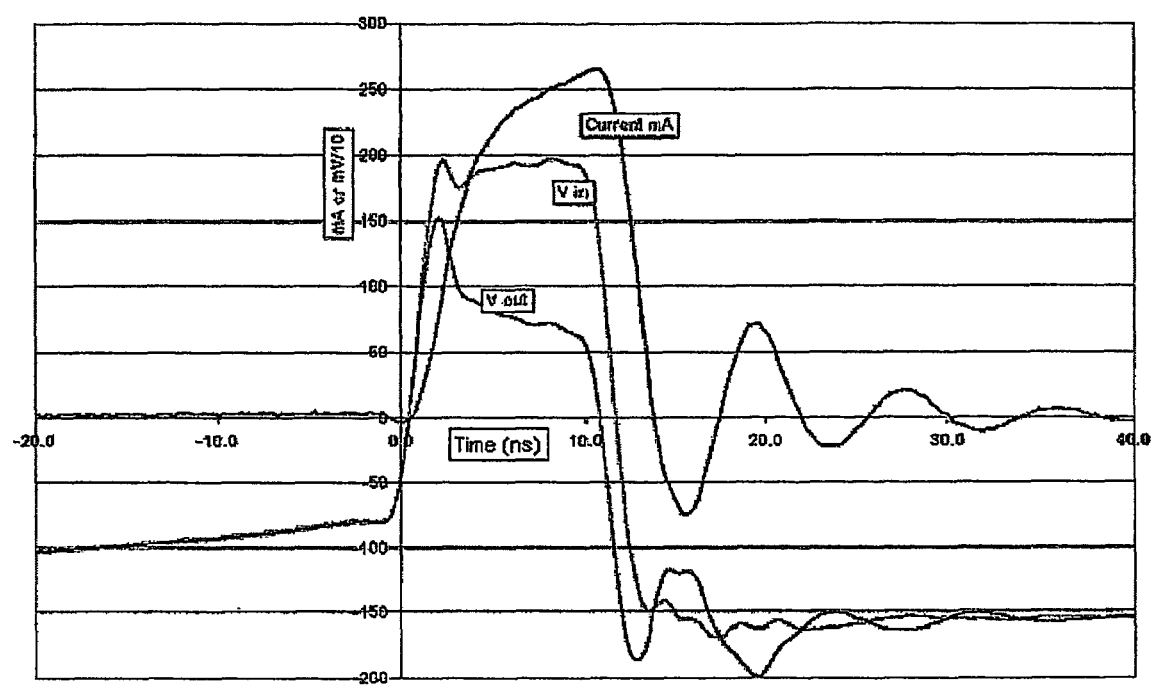
FIG. 8 is an illustration of the operational amplifier (Op-Amp) output of the LD driver circuit with laser diode voltage and current waveform signals of approximately 10 ns width.

Since the voltage applied to the LD resistor circuit does not directly indicate the magnitude of the laser current, the LD current pulse is deduced from the potential across the resistor. This method better predicts the optical power output, the turn-on rise time, and makes visible the stored charge flowing in reverse direction from the LD during turn-off. Typical behaviour is illustrated in FIG. 8.

Operation in LED Mode:

In order to switch the output of the LD to the broad LED spectrum, the power supply circuitry shown in FIG. 6 includes a software-controlled switch that connects Vh to a variable resistance VR3. This resistance acts as a voltage divider and is used to reduce Vh to a level of about 250 mV, thereby reducing the current into the LD. The LD is now unable to reach the laser threshold and the fight emission is predominantly spontaneous, as in an LED.

In all other respects, the dynamic behaviour of the LD in LED mode is the same as that described above. The broad LED spectrum now includes a component that coincides with the filter window, allowing the Rayleigh scattering at the filter wavelength to be detected directly, using the same optical arrangement as that used to measure the Raman scattered light. The reduced intensity of light emitted at the filter wavelength by the LD in LED mode is compensated to some extent by the higher efficiency of the Rayleigh scattering, relative to the Raman scattering.

In this way, the temperature-dependent Raman scattering and temperature-independent Rayleigh scattering can be obtained using a common optical arrangement. Anomalies in the fibre transmission (associated for example with kinks or strain in the fibre) can therefore be identified qualitatively in the Rayleigh scattering. These anomalies may then be discounted in the temperature dependent Raman measurement. Alternatively, the Rayleigh scattering information can be used as the basis for a mathematical correction of the temperature distribution obtained from the Raman measurement. The correction must take into account the difference in attenuation for probe light at the LD wavelength and at the filter wavelength. This difference in attenuation is readily obtained by comparison of Rayleigh and Raman measurements taken with the fibre subjected to a known temperature distribution.

It will be appreciated that a number of alternative means for generating LED output from a LD will be apparent to those skilled in the art.

The invention claimed is:

1. A temperature sensing method in which pulses of optical radiation are launched by a laser diode into an optical fibre and optical radiation backscattered from the fibre is detected, the method comprising passing the backscattered radiation through a single optical filter whereby a first signal from Raman scattering is recorded at the anti-Stokes Raman wavelength from a pulse launched by the laser diode in a laser mode and a second signal from Rayleigh scattering is recorded at the anti-Stokes Raman wavelength from a pulse launched by the laser diode in a light emitting diode mode, and a comparison is made of the two signals, wherein said detecting is performed using a light detector to count photons passing through the single optical filter, wherein the photon count provides an indication of temperature and the arrival time of the signals allows identification of the position of that temperature along the length of the optical fibre.

2. The temperature sensing method according to claim 1 wherein the comparison produces the quotient of the intensity of the Raman scattering at the anti-Stokes Raman wavelength divided by the intensity of the Rayleigh scattering at the anti-Stokes Raman wavelength.

3. The temperature sensing method according to claim 1 wherein the laser diode, the single optical filter and the light detector are coupled to the optical fibre via connectors and at least one temperature sensor is positioned downstream of the connectors to correct error signals emanating from the connectors.

4. The temperature sensing method according to claim 3 wherein a thermistor or thermocouple is located down the optical fibre to provide a temperature indication and allow for the influence of connector error.

5. The temperature sensing method according to claim 1, comprising stabilising and controlling the temperature of the laser diode and light detector.

6. The temperature sensing method according to claim 5 wherein a short reference section of the optical fibre is held at constant temperature in a temperature controlled chamber.

7. The temperature sensing method according to claim 6 comprising providing two distinct controlled temperature regions and monitoring the temperatures through use of sensors in each region, and monitoring the effect of the temperature controlled region on the accumulated photon count.

8. The temperature sensing method as claimed in claim 1 wherein the pulses of optical radiation are transmitted at a wavelength between the ultra-violet and infrared spectrum.

9. The temperature sensing method as claimed in claim 8 wherein the wavelength is in the range 775-800 nm.

10. The temperature sensing method as claimed in claim 1 wherein the laser diode is selected to have transmission power of less than 1 W.

11. A distributed temperature sensor comprising a laser diode adapted to launch pulses of optical radiation into an optical fibre arranged to be located in thermal contact with an object, and a single optical filter coupled to a light detector to detect optical radiation backscattered from the fibre, wherein pulses of optical radiation are launched by the laser diode into the optical fibre and optical radiation backscattered from the fibre is detected by passing the backscattered radiation through the single optical filter whereby a first signal from Raman scattering is recorded at the anti-Stokes Raman wavelength from a pulse launched by the laser diode in a laser mode and a second signal from Rayleigh scattering is recorded at the anti-Stokes Raman wavelength from a pulse launched by the laser diode in a light emitting diode mode, and a comparison is made of the two signals, wherein the light detector counts photons passing through the single optical filter, wherein the photon count provides an indication of temperature and the arrival time of the signals allows identification of the position of that temperature along the length of the optical fibre.

12. The distributed temperature sensor according to claim 11 wherein the laser diode, the single optical filter and the light detector are coupled to the optical fibre via connectors and at least one temperature sensor is positioned downstream of the connectors to isolate error signals emanating from the connectors.

13. The distributed temperature sensor according to claim 11 comprising control means to stabilise and control the temperature of the laser diode and light detector.

14. The distributed temperature sensor according to claim 13 wherein sensors are positioned in two distinct temperature regions to monitor the temperatures to monitor the effect of the temperature calibration region on the photon count.

15. The distributed temperature sensor according to claim 11 wherein the laser diode has a transmission power of less than 1 W.

16. The distributed temperature sensor according to claim 11 wherein the light detector is a photomultiplier tube.

17. A temperature sensing method in which pulses of optical radiation are launched by a laser diode into an optical fibre and optical radiation backscattered from the fibre is detected, the method comprising passing the backscattered radiation through a single optical filter whereby a first signal from Raman scattering is recorded at the Stokes Raman wavelength from a pulse launched by the laser diode in a laser mode and a second signal from Rayleigh scattering is recorded at the Stokes Raman wavelength from a pulse launched by the laser diode in a light emitting diode mode, and a comparison is made of the two signals, wherein said detecting is performed using a light detector to count photons passing through the single optical filter, wherein the photon count provides an indication of temperature and the arrival time of the signals allows identification of the position of that temperature along the length of the optical fibre.

* * * * *